United States Patent
Mohajer

(10) Patent No.: US 8,694,537 B2
(45) Date of Patent: Apr. 8, 2014

(54) SYSTEMS AND METHODS FOR ENABLING NATURAL LANGUAGE PROCESSING

(75) Inventor: Keyvan Mohajer, San Jose, CA (US)

(73) Assignee: SoundHound, Inc., Santa Clara, CA (US)

( * ) Notice: Subject to any disclaimer, the term of this patent is extended or adjusted under 35 U.S.C. 154(b) by 0 days.

(21) Appl. No.: 13/480,400

(22) Filed: May 24, 2012

(65) Prior Publication Data

US 2012/0233207 A1 Sep. 13, 2012

Related U.S. Application Data

(63) Continuation-in-part of application No. 12/861,775, filed on Aug. 23, 2010.

(60) Provisional application No. 61/368,999, filed on Jul. 29, 2010.

(51) Int. Cl.
G06F 17/30 (2006.01)

(52) U.S. Cl.
USPC ............................................ 707/769; 704/235

(58) Field of Classification Search
USPC ............................................ 707/769; 704/235
See application file for complete search history.

(56) References Cited

U.S. PATENT DOCUMENTS

| | | | |
|---|---|---|---|
| 5,969,283 A | 10/1999 | Looney et al. | |
| 5,974,409 A | 10/1999 | Sanu et al. | |
| 7,693,720 B2 * | 4/2010 | Kennewick et al. | 704/275 |
| 8,296,179 B1 | 10/2012 | Rennison | |
| 2001/0014891 A1 | 8/2001 | Hoffert et al. | |
| 2002/0138630 A1 | 9/2002 | Solomon et al. | |
| 2003/0078928 A1 | 4/2003 | Dorosario et al. | |
| 2003/0106413 A1 | 6/2003 | Samadani et al. | |
| 2004/0019497 A1 | 1/2004 | Volk et al. | |
| 2004/0193420 A1 | 9/2004 | Kennewick et al. | |
| 2005/0016360 A1 | 1/2005 | Zhang | |
| 2005/0027699 A1 | 2/2005 | Awadallah et al. | |
| 2006/0155694 A1 | 7/2006 | Chowdhury et al. | |
| 2006/0242017 A1 | 10/2006 | Libes et al. | |
| 2007/0288444 A1 * | 12/2007 | Nelken et al. | 707/3 |
| 2008/0154951 A1 | 6/2008 | Martinez et al. | |
| 2008/0249982 A1 | 10/2008 | Lakowske | |

(Continued)

FOREIGN PATENT DOCUMENTS

| | | |
|---|---|---|
| WO | 2008004181 | 1/2008 |
| WO | 2013/177213 | 11/2013 |

OTHER PUBLICATIONS

Avery Li-Chun Wang, An Industrial-Strength Audio Search Algorithm, In ISMIR 2003, 4th Symposium Conference on Music Information Retrieval (Oct. 26, 2003), pp. 7-13.

(Continued)

*Primary Examiner* — Joshua Bullock
(74) *Attorney, Agent, or Firm* — Carr & Ferrell LLP

(57) ABSTRACT

Systems and methods for searching databases by sound data input are provided herein. A service provider may have a need to make their database(s) searchable through search technology. However, the service provider may not have the resources to implement such search technology. The search technology may allow for search queries using sound data input. The technology described herein provides a solution addressing the service provider's need, by giving a search technology that furnishes search results in a fast, accurate manner. In further embodiments, systems and methods to monetize those search results are also described herein.

25 Claims, 8 Drawing Sheets

(56) References Cited

U.S. PATENT DOCUMENTS

| | | |
|---|---|---|
| 2008/0255937 A1 | 10/2008 | Chang et al. |
| 2009/0064029 A1 | 3/2009 | Corkran et al. |
| 2010/0205166 A1 | 8/2010 | Boulter et al. |
| 2010/0250497 A1 | 9/2010 | Redlich et al. |
| 2011/0071819 A1 | 3/2011 | Miller et al. |
| 2014/0019483 A1 | 1/2014 | Mohajer |

OTHER PUBLICATIONS

Venkatachalam, V., Cazzanti, L., Chillon, N., Wells, M., Automatic Identification of Sound Recordings, Signal Processing Magazine, IEEE, Mar. 2004, 92-99, vol. 21, Issue 2.

Nelson, Jeffrey, V Cast Song ID from Verizon Wireless. May 21, 2007.

Gracenote: MusicID, available at http://www.gracenote.com/business_solutions/music_id/, last accessed Aug. 4, 2010.

Shazam: http://web.archive.org/web/20100501190631/http://www.shazam.com/. Last accessed May 1, 2010.

App Shopper Shazam: http://appshopper.com/music/shazam. Last changed May 23, 2013.

Gracenote Mobile MusicID: http://web.archive.org/web/20100123211802/http://www.gracenote.com/business_solutions/mobileMusic/. Last accessed Jan. 23, 2010.

App Shopper MusicID: http://appshopper.com/music/musicid. Last changed Feb. 8, 2013.

Wang. "The Shazam Music Recognition Service," Communications of the ACM(Magazine), Aug. 2006. vol. 49, No. 8, p. 44-48. http://dl.acm.org/citation.cfm?id=1145312.

Xu et al. "Music Identification Via Vocabulary Tree with MFCC Peaks," MIRUM '11 Proceedings of the 1st international ACM workshop on Music information retrieval with user-centered and multimodal strategies, 2011. p. 21-26. http://dl.acm.org/citation.cfm?doid=2072529.2072537.

Li et al. "Robust Audio Identification for MP3 Popular Music," SIGIR '10 Proceedings of the 33rd international ACM SIGIR conference on Research and development in information retrieval, Jul. 2010. p. 627-634. http://dl.acm.org/citation.cfm?doid=1835449.1835554.

Yu et al. "A Query-By-Singing System for Retrieving Karaoke Music," IEEE Transactions on Multimedia, Dec. 2008, vol. 10, No. 8, p. 1626-1637. http://ieeexplore.ieee.org/xpl/articleDetails.jsp?arnumber=4694852.

Casey et al. "Content-Based Music Information Retrieval: Current Directions and Future Challenges," Proceedings of the IEEE, 2008. vol. 96, No. 4, p. 668-696. http://research.yahoo.com/pub/2649.

Liu et al. "Content-Based Retrieval of MP3 Music Objects," CIKM '01 Proceedings of the tenth international conference on Information and knowledge management, 2001. p. 506-511. http://dx.doi.org/10.1145/502585.502670.

OMRAS2—Ontology-Driven Music Retrieval & Annotation Sharing Service. Overview—Apr. 24, 2009 [Accessed Sep. 27, 2012—Archive.org] http://web.archive.org/web/20090424083019/http://www.omras2.org/overview.

OMRAS2—AudioDB—Populating and Querying an AudioDB Instance. (No archived version available—accessed Sep. 27, 2012 via Google) http://omras2.org/audioDB/tutorial1.

Benson et al. "Sync Kit: A Persistent Client-Side Database Caching Toolkit for Data Intensive Websites," Proceedings Of The 19th International Conference On World Wide Web, Apr. 2010. pp. 121-130. http://dl.acm.org/citation.cfm?id=1772704.

Larson et al. "NYT to Release Thesaurus and Enter Linked Data Cloud," NY Times Blogs, Jun. 2009. http://open.blogs.nytimes.com/2009/06/26/nyt-to-release-thesaurus-and-enterlinked-data-cloud/.

"Aurix Enhances Effectiveness Of Leading Search Software," Aurix.com—News. Jun. 1, 2010. http://www.aurix.com/pages/3808/Aurix_enhances_effectiveness_of_leading_search_software.htm.

"Hearing it Loud & Clear at SpeechTEK 2010," Aurix.com—News. Jul. 21, 2010, http://www.aurix.com/pages/4161/State_of_the_art_speech_technology.htm.

Jamil. "A Natural Language Interface Plug-In For Cooperative Query Answering In Biological Databases," BMC Genomics, Nov. 2011. (Accessed Sep. 27, 2012 via SpringerLink) http://www.biomedcentral.com/1471-2164/13/S3/S4.

Feng. "A General Framework for Building Natural Language Understanding Modules in Voice Search," 2010 IEEE International Conference on Acoustics Speech and Signal Processing (ICASSP), Mar. 2010. (Accessed Sep. 27, 2012—IEEE) http://ieeexplore.ieee.org/xpl/articleDetails.jsp?arnumber=5494951.

Langanke. "Direct Voice Control Speech Data Entry and Database Query Models," International Symposium on Logistics and Industrial Informatics, Sep. 2007. (Accessed Sep. 27, 2012—IEEE) http://ieeexplore.ieee.org/xpl/articleDetails.jsp?arnumber=4343522.

Indukuri et al. "Natural Language Querying Over Databases Using Cascaded CRFs," Lecture Notes in Computer Science, Sep. 2010, http://www.springerlink.com/content/5w1x27650475304m.

Kolias et al. "Design and implementation of a VoiceXML-driven wiki application for assistive environments on the web," Personal and Ubiquitous Computing, Sep. 2010. vol. 14, No. 6, p. 527-539, http://www.icsd.aegean.gr/publication_files/journal/295233664.pdf.

International Search Report & Written Opinion dated Dec. 2, 2013 in Application No. PCT/US13/42097, filed May 21, 2013.

* cited by examiner

SYSTEMS AND METHODS FOR ENABLING NATURAL LANGUAGE PROCESSING

CROSS REFERENCES TO RELATED APPLICATIONS

This nonprovisional patent application is a continuation-in-part of U.S. patent application Ser. No. 12/861,775 filed on Aug. 23, 2010, titled "SYSTEMS AND METHODS FOR SEARCHING DATABASES BY SOUND INPUT," which claims the priority benefit of provisional U.S. Patent Application Ser. No. 61/368,999 filed on Jul. 29, 2010, titled "System and method for enabling search functionality of databases belonging to multiple service providers on a computer network," which is hereby incorporated by reference in its entirety.

FIELD OF THE INVENTION

The present invention relates generally to searching databases. The invention relates more particularly to systems and methods for searching databases of service providers on a network, and also to systems and methods that process natural language queries.

SUMMARY OF THE INVENTION

Service providers, such as owners of mobile services and/or applications, may offer services, products, and/or content to end users through a computer network. A service provider may wish to allow end users to search one or more databases that are used in the services, products, and/or content provided by the service provider. An example of a service provider may be an owner of a mobile business directory application who wishes to voice-enable his or her business directory application. An enhanced search experience can significantly improve the user engagement and ultimately success of the service and/or application, particularly in mobile environments. However, both the infrastructure and the technology for providing search functionality may not be owned, licensed or be otherwise accessible to service providers. As an example, if a service provider wishes to implement voice-enabled search with their mobile service, it would be difficult to do so because the conventional infrastructure for search technology may be complicated and expensive to establish.

In accordance to some embodiments of the present technology, an exemplary method for searching one or more databases includes several steps. A database may be received from a service provider by a database upload via a network, where the database has one or more records and the one or more records include at least one field. The one or more records of the database may be processed based on the at least one field. A search query may be received via the network, where the search query includes search parameters of the at least one field of the one or more records of the processed database, and may be provided by sound data input from an end user. One or more search results may be determined in the processed database, based upon the search parameters of the search query, and the one or more search results may be transmitted for display to the end user via the network. Using the exemplary method, a service provider may be able to provide search functionality to users, without the need for the service provider to build the requisite infrastructure or develop sound-enabled search technology.

In various embodiments, the technology allows for a server to allow an uploading of a service provider's databases(s) and using this technology, the service provider's database(s) become searchable on the server using a unique search technology, without the need for the service provider to build the infrastructure or the technology. According to exemplary embodiments of the technology, the search technology allows for search queries to be provided by sound data input from a service provider or from an end user. The sound data input may comprise voice or spoken word, music, and any other type of sound input.

In various embodiments, an exemplary method for providing the one or more search results may include receiving a search query by a database upload via a network, where the search query includes one or more query chunks of at least one field of the one or more records of a processed database and the search query is provided by sound data input from an end user. The one or more search results may be determined in the processed database based upon the one or more query chunks of the search query. One or more fields of the one or more search results may be selectively transmitted for display to the end user via the network, and one or more additional fields of the one or more search results may also be selectively transmitted for display in real time to the end user via the network.

Furthermore, the search provider may wish to derive revenue from the database search functionalities described herein. Exemplary methods for providing advertising in the one or more search results are provided. A search query may be received for one or more application verticals via a network, where the search query includes search parameters of the at least one field of the one or more records of a processed database. An advertisement database may be searched based upon a search history that includes historic search parameters, and one or more advertisement results may be generated across the one or more application verticals, based upon the historic search parameters. The one or more advertisement results may be transmitted via the network. In an exemplary embodiment, the position of the search results may be influenced using a bidding process when advertising is delivered onto application verticals, thereby generating additional revenue from the provided advertising. Service providers may have an additional incentive to utilize the described methods and systems for searching databases by receiving a portion of the revenues generated by advertising in accordance with various embodiments.

According to some embodiments, the present technology may be directed to methods for processing natural language queries. The methods may comprise: (a) receiving two or more natural language libraries from service providers, where each natural language library comprises: (i) natural language queries for interacting with a client application; and (ii) responses for the natural language queries; (b) generating an aggregated natural language library from the received natural language libraries; (c) receiving a natural language search query via the network, the natural language search query at least comprising sound data input; (d) comparing the sound data input to the aggregated natural language library to determine at least one natural language query that corresponds to the sound input data; and (e) providing a response to the at least one natural language queries from the responses associated with the natural language query included in the aggregated natural language library.

According to other embodiments, the present technology may be directed to a natural language query processor that comprises: (a) a memory for storing executable instructions; (b) a processor for executing instructions stored in memory to: (i) receive natural language libraries from service providers, where each natural language library comprises: (1) natural language queries for interacting with a client application; (2) responses for the natural language queries; (ii) generate an aggregated natural language library from the received natural language libraries; (iii) receive a natural language search query via the network from at least one client, the natural language search query comprising sound data input; (iv) compare the sound data input to the aggregated natural language library to determine at least one natural language query that corresponds to the sound input data; and (v) provide a response to the at least one natural language query from the responses associated with the natural language queries included in the aggregated natural language library.

DETAILED DESCRIPTION

Figure 1:
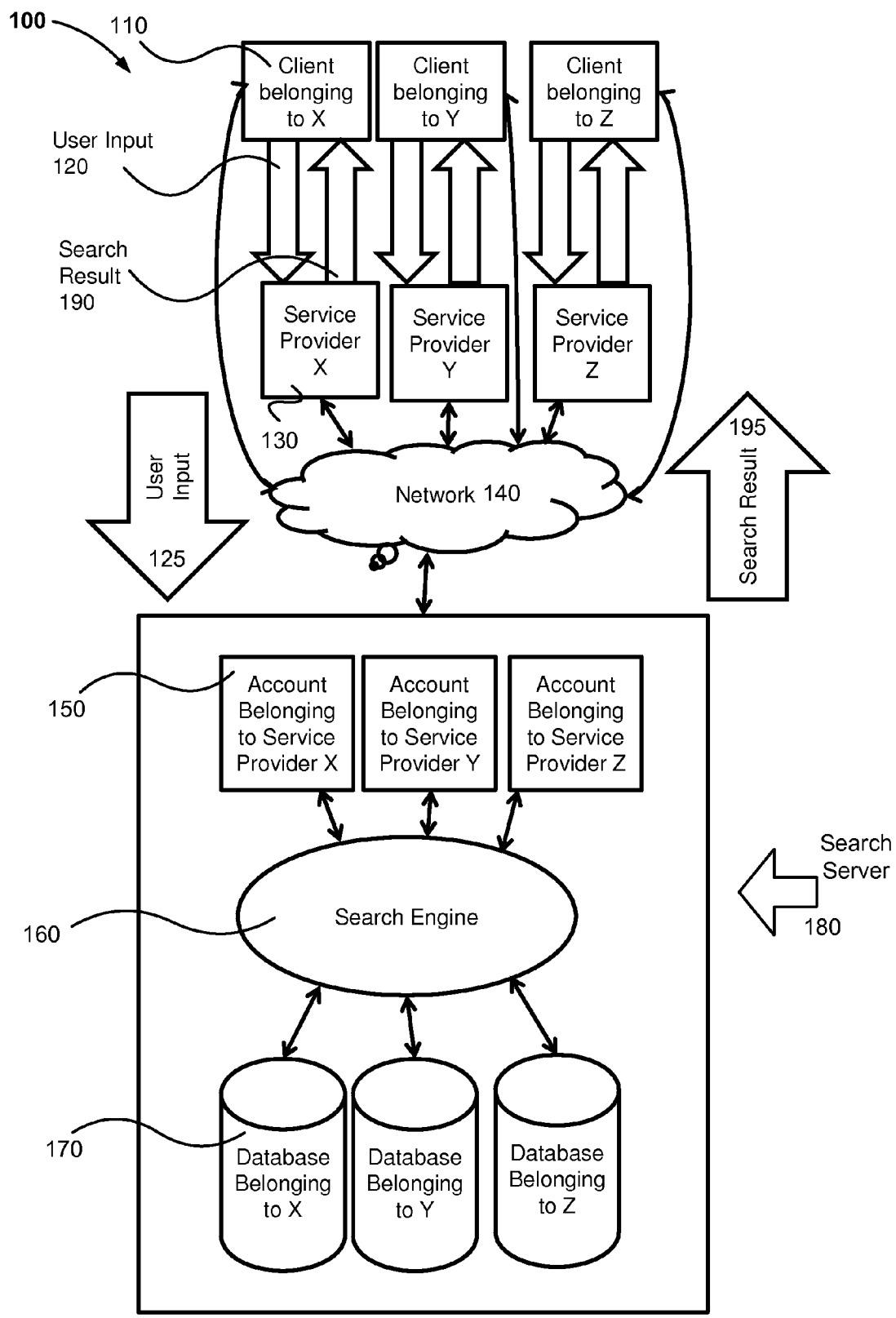
FIG. 1 is a block diagram of an exemplary system for searching one or more databases in accordance with various embodiments of the present invention.

Various embodiments of the present invention provide systems and methods for searching one or more databases. In some exemplary embodiments, the present technology may allow for databases of service providers to be searched by one or more end users within a network. Service providers offering services, products, and/or content to end users through a computer network may store records accessible to the end users in one or more databases. Further, a service provider may wish to allow end users to search the one or more databases. For example, if the service provider provides end users with listings of restaurants and information associated with the restaurants (e.g., reviews and end user comments), it would be beneficial to give end users the ability to search for records pertaining to restaurants quickly and easily. However, conventional search engines may be difficult and costly to implement. This is further compounded by the fact that oftentimes, service providers do not own the infrastructure and/or the technology to enable such search experience for their end users.

According to various embodiments of the present invention, systems and methods are provided herein that are related to searching databases of service providers. In exemplary embodiments, the technology presented herein easily makes a service provider's database of records searchable through a computer network without the need to develop the search technology. In further embodiments, the technology furnishes relevant search results along with deep relevant content to the end users quickly. In yet further embodiments, the technology allows for the monetization of the search results.

Further, systems and methods for searching one or more databases using cloud computing are described herein. An exemplary system for searching a database may include a communications module configured to receive the database from a service provider by a database upload via a network, the database having one or more records, the one or more records including at least one field. The system may also include a processor for executing instructions stored in memory to process the one or more records of the database based on the at least one field. The processor may also execute instructions stored in memory to: receive a search query via the network, the search query including search parameters of the at least one field of the one or more records of the processed database, the search query provided by sound data input by an end user; determine one or more search results in the processed database based upon the search parameters of the search query; and transmit for display the one or more search results to the end user via the network.

By using cloud computing to provide search capability to the one or more databases, a service provider may take utilize the computing resources, software and information provided by the cloud, without having to invest the time and resources into providing search ability using conventional means. For instance, according to various embodiments, a service provider may wish to enable its users to search its database by speaking all or parts of a field in their database of records. In such an embodiment, the service providers may take advantage of a speech recognition search engine without having to develop the necessary technology and infrastructure, yet still maintain control over the manner in which the search results are presented to the users.

Furthermore, a service provider may wish to enhance the presentation of search results to the end user to gain competitive advantage over competitors of the service provider. Systems and methods for providing search results are described that may enhance the speed of searching and enhance the search results with images and/or rich content. An exemplary system for providing one or more search results may include a communications module configured to receive a search query via a network. The search query may include one or more query chunks of at least one field of the one or more records of a processed database. The search query may be provided by sound data input from an end user. The exemplary system may also include a processor for executing instructions stored in memory to: determine the one or more search results in the processed database, based upon the one or more query chunks of the search query; selectively transmit for display in real time to the end user, via the network, one or more fields of the one or more search results; and selectively transmit for display in real time to the end user, via the network, one or more additional fields of the one or more search results. By utilizing the cloud computing network, a service provider may be able to provide search results along with additional content that may enhance the search experience for end users, thereby providing enhanced functionality without any additional burden being placed upon the service provider.

Finally, exemplary embodiments of a cloud computing system as described herein may be monetized for service providers and other parties by providing advertising with the search results. An exemplary system for providing advertising in one or more search results may include a network having at least one service provider and one or more end users. The system may also include a server coupled to the network that is configured to receive a database from the at least one service provider by a database upload via a network. The database may include one or more records, the one or more records having at least one field. The server may also be configured to process the one or more records of the database based on the at least one field. The server may be further configured to receive a search query via the network. The search query may include search parameters of the at least one field of the one or more records of the processed database, and may be provided by sound data input from an end user. One or more search results may be determined in the processed database, based upon the search parameters of the search query.

Additionally, the server may be configured to search an advertisement database based upon the search query or the one or more determined search results and generate one or more advertisement results across the one or more application verticals, based upon the search of the advertisement database. The one or more search results may be transmitted for display to the end user via the network, and the one or more advertisement results may also be transmitted for display via the network, where the one or more advertisement results are associated with the one or more search results.

Service providers and/or advertisers may thereby provide advertising across one or more service application verticals, by utilizing the resources of the cloud network, instead of being required to employ a separate advertising system. In an exemplary embodiment, the position of the search results may be influenced using a bidding process when advertising is delivered onto application verticals, thereby generating additional revenue from the provided advertising. Service providers may have an additional incentive to utilize the described methods and systems for searching databases by receiving a portion of the revenues generated by advertising in accordance with various embodiments. To further customize the advertising, search query history and information relating to the end user may also be utilized to potentially increase the effectiveness of advertising.

It will be noted that as used herein the term "cloud computing" encompasses network-based computing, where computing resources, software and information are provided over the network and are accessible by service providers and/or user devices. User devices may include but are not limited to desktops, PCs, laptops, notebooks, game consoles (e.g., an X-box), music players, tablets, IPods, Smartphones, automobile computer systems, and Internet enabled TVs. A Smartphone may be generally defined as a phone with computing capability. A Smartphone may provide Internet access to an end user.

FIG. 1 is a block diagram of an exemplary system 100 for searching one or more databases in accordance with various embodiments of the present invention. The system 100 may include one or more clients 110, one or more service providers 130, a network 140, and a search server 180. The search server 180 may include one or more accounts 150, a search engine 160, and one or more databases 170. In various embodiments, the one or more databases 170 may belong to one or more service providers 130.

As with all of the figures provided herein, one skilled in the art will recognize that any number of elements can be present in the exemplary system 100 and that the exemplary methods described herein can be executed by one or more of elements. Any number of any of elements can be present in the exemplary system 100, and the exemplary system 100 is configured to serve these elements. For example, the search server 180 may communicate search results via the network 140 to the one or more clients 110, despite the fact that only three clients are shown in FIG. 1. For all figures mentioned herein, like numbered elements refer to like elements throughout.

The one or more clients 110 may be a user device used by the end user to access a network 140. In various embodiments, the client 110 may be a user device used to access the service provider 130 and/or one or more of the databases 170 via the network 140. The client 110 may include network browser applications (not shown) configured to render content pages, such as web pages from the Internet. The client 110 may communicate with the service provider 130 over the network 140.

The one or more service providers 130 may provide a service to at least one client 110 over a network. Examples of such services may include providing video content, and/or providing information regarding entertainment, restaurants, and the like. The service may be a web service that allows end users to access the service and/or software over the Internet (e.g., by using a user interface loaded in a web browser).

A given service provider 130 may have an account 150 on the search server 180. The account 150 may include account information related to the service provider's account. The included account information may include authentication information, billing information and/or contact information as described below. An account 150 may be a prerequisite before a service provider may gain access to the search server and provide the one or more databases 170 to the search server 180. The one or more databases 170 may be stored on the search server 180. Furthermore, the one or more databases 170 may be received onto the search server 180 using a database upload. The database upload may be performed, for example, over the network 140.

The network 140 can be any type of network, including but not limited to the Internet, LAN, WAN, a telephone network, and any other communication network that allows access to data, as well as any combination of these. The network 140 may be a public network (e.g., the Internet) or a private network, and may take the form of a wired or wirelessly network.

The one or more service providers 130 may receive a user input 120 from the one or more clients 110. The user input 120 may be entered using the user device, for example, and include a search query. The search query may be a request for information contained within the one or more databases 170, and may include search parameters, as described further below. The search query may furthermore include sound data input by the end user onto the client 110. The user input 120 may be relayed to the search server 180 via the network 140. As shown in FIG. 1, the search server 180 may accommodate user inputs 125 from one or more service providers 130. Also, as shown in FIG. 1, a user input 120 may be relayed to the search server 180 through the service provider 130, or may be transmitted to the network 140 without being relayed by the service provider 130.

One or more search engines 160 may be used to process the one or more databases 170 as described below and provide search functionality for the databases 170. The search engine 160 may also be used to generate search results from the databases 170. The search of the one or more databases 170 may be performed by a single search engine, or by multiple search engines, where each search engine performs searches based upon a different type of search query. For example, a text search may be performed by a first search engine, while a spoken word search may be performed by a second search engine. The search results may include one or more records from the databases 170 that match or are related to one or more search parameters of the search query.

Using the search engine 160, the search server 180 may transmit one or more search results 190 from the databases 170 in response to the user input 120. Using the network 140, the search results 190 may be transmitted to the service provider 130, and the service provider 130 may relay the search results 190 back to the client 110. As shown in FIG. 1, the search server 180 may determine and transmit search results 195 from one or more service providers 130. Furthermore, a search result 190 may be relayed to the client 110 through the service provider 130, or may be transmitted via the network 140 without being relayed through the service provider 130. The system 100 may thereby provide search functionality to the one or more databases 170. Among other benefits, the system 100 may advantageously provide advanced search ability, such as searching using sound data, by storing and processing the one or more databases 170 outside of the infrastructure of the service providers.

Figure 2:
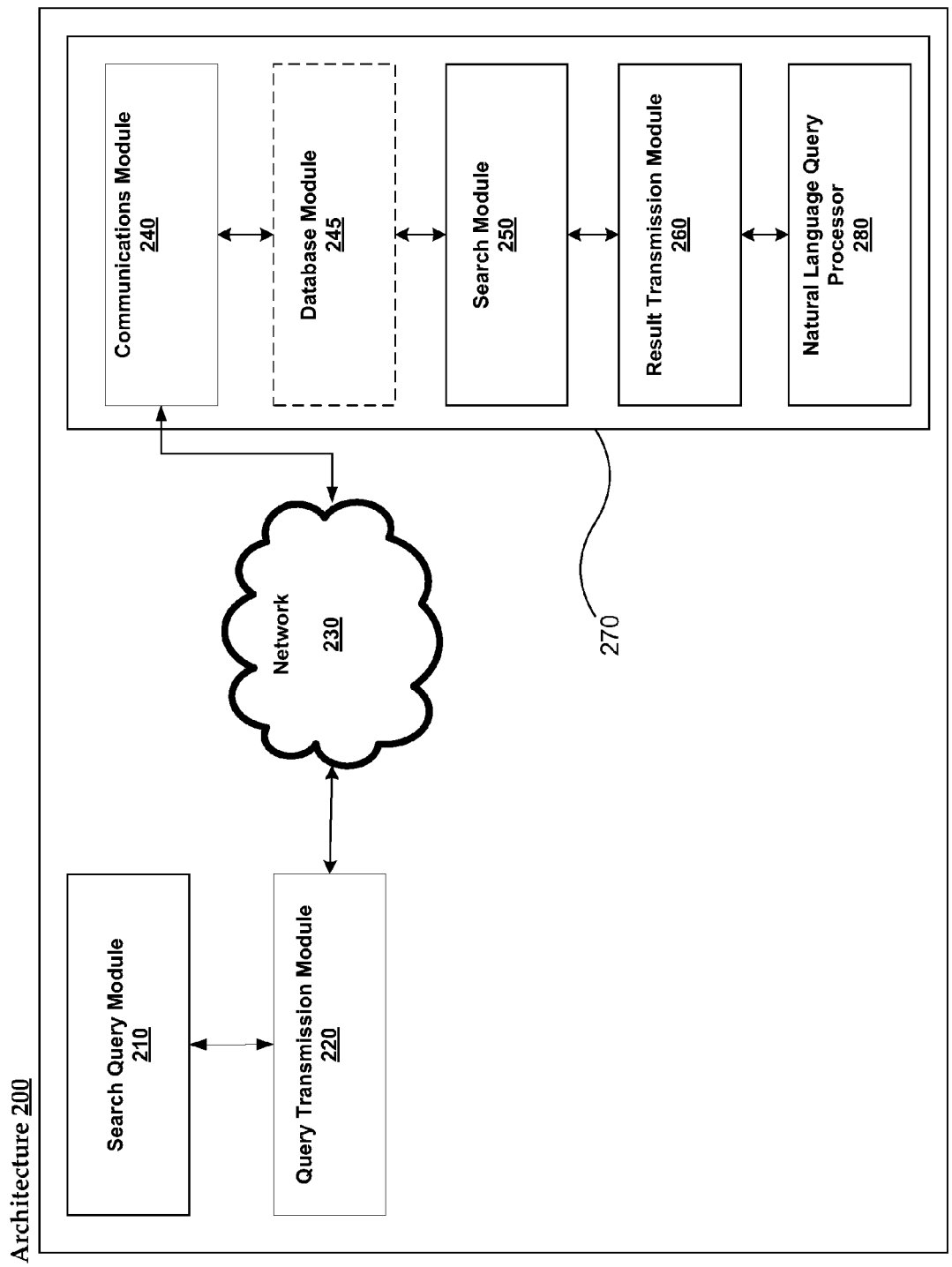
FIG. 2 is a block diagram of an exemplary system for searching one or more databases in accordance with various embodiments of the present invention.

FIG. 2 illustrates an exemplary architecture 200 associated with a search server 270 (such as the exemplary search server 180 shown in FIG. 1). The architecture 200 includes a search query module 210, a query transmission module 220, a network 230, a communications module 240, a search module 250, a result transmission module 260, and a natural language query processor 280. Alternative embodiments may comprise more, less, or functionally equivalent modules. Although various modules may be configured to perform some or all of the various steps described herein, fewer or more modules may be provided and still fall within the scope of various embodiments.

The search query module 210 may receive a search query from a search query originator. In various embodiments, a search query originator may be an end user utilizing a user device or a server operated by the service provider. The search query originator may provide the search query for use by the search module 250. Furthermore, the search query originator receives search results provided by the search server 270 via the network 230 after a search has been performed by search module 250.

The search query may include an end user's request for information of a database on the search server 270. The search query may be received in any suitable form. For example, an end user may furnish the search query or a portion of the search using a microphone to capture sound data. Furthermore, the end user may use a camera or similar recording device to include an image in the search query. The contents of the search query may include sound data, text, spoken words, image, other data, or any combination thereof. In some embodiments, the search query module 210 may provide one or more user interfaces on the user device to input the search query (e.g., a button on a display screen, or a plurality of buttons on the display screen, which may be used to specify a service provider).

After the search query module 210 receives the search query, the search query may be provided to the query transmission module 220, which may transmit the search query to the communications module 240 via the network 230. The network 230 may be any suitable computer network or plurality of networks permitting communication between a service provider and/or an end user and the search server 270. The network 230 may include any type and number of databases, servers, end users, computing devices, and policy engines.

In some exemplary embodiments, the query transmission module 220 may perform a step of dividing the search query into one or more query chunks. A query chunk may be a predetermined fragment or a portion of the search query. A query chunk may be of any size. For example, if the search query includes spoken words, the query chunks may include words or phrases from the words spoken by the end user. Likewise, if the search query includes text and sound data, then the text may be divided into a separate chunk from the sound data. Because the search query may include large amounts of data, dividing the search query into chunks may advantageously increase the speed at which the search request is received and processed in some embodiments. The increase in speed may be derived from reductions in transmission delay and the effects of network latency due to transmission of smaller query chunks instead of an entire search query.

Together, the communications module 240, the database module 245, the search module 250 and the result transmission module 260 may be considered to constitute a search server 270. The communications module 240 may perform a step of receiving one or more databases from a service provider (such as the step 310 of the method 300 described below in relation to FIG. 3). The one or more databases may be stored on the search server 270, in the database module 245, for example, and may be transmitted to the search module 250 for processing as described below.

The communications module 240 may perform a step of receiving a search query (such as the step 330 of the method 300 described below in relation to FIG. 3). The search query may then be transmitted to the search module 250 for purpose of performing a search, as described below.

The database module 245 may store the one or more databases received from the service provider. The one or more databases may be stored prior to processing by the search module 250 and/or after the processing has taken place. If the database module 245 has not yet received a database from the service provider, then the database module may not contain any databases. By storing one or more databases on the database module 245, and processing and searching of the one or more databases may advantageously be performed outside of the infrastructure of the service provider.

The search module 250 may perform the steps of processing the one or more records of the database (such as the step 320 of the method 300 described below in relation to FIG. 3). In an exemplary embodiment, the search module 250 may optionally determine search parameters of the search query, although in other embodiments the search parameters may be received with the search query by the communications module 240. The search module 250 may also perform the step of determining one or more search results in the processed database (such as the step 340 of the method 300 described below in relation to FIG. 3). The aforementioned steps may be performed by separate modules, or by the same module (as shown in FIG. 2) according to various embodiments.

The result transmission module 260 may perform a step of transmitting one or more search results for display to the end user via the network 230 (such as the step 350 of the method 300 described below in relation to FIG. 3). The search results may be transmitted to a service provider and relayed to the end user for display. The search results may alternatively be transmitted to the end user for display directly on the user device. It will be appreciated by one skilled in the art that the system in FIG. 2 may be merged with or used in conjunction with any of the other exemplary systems described herein.

Figure 3:
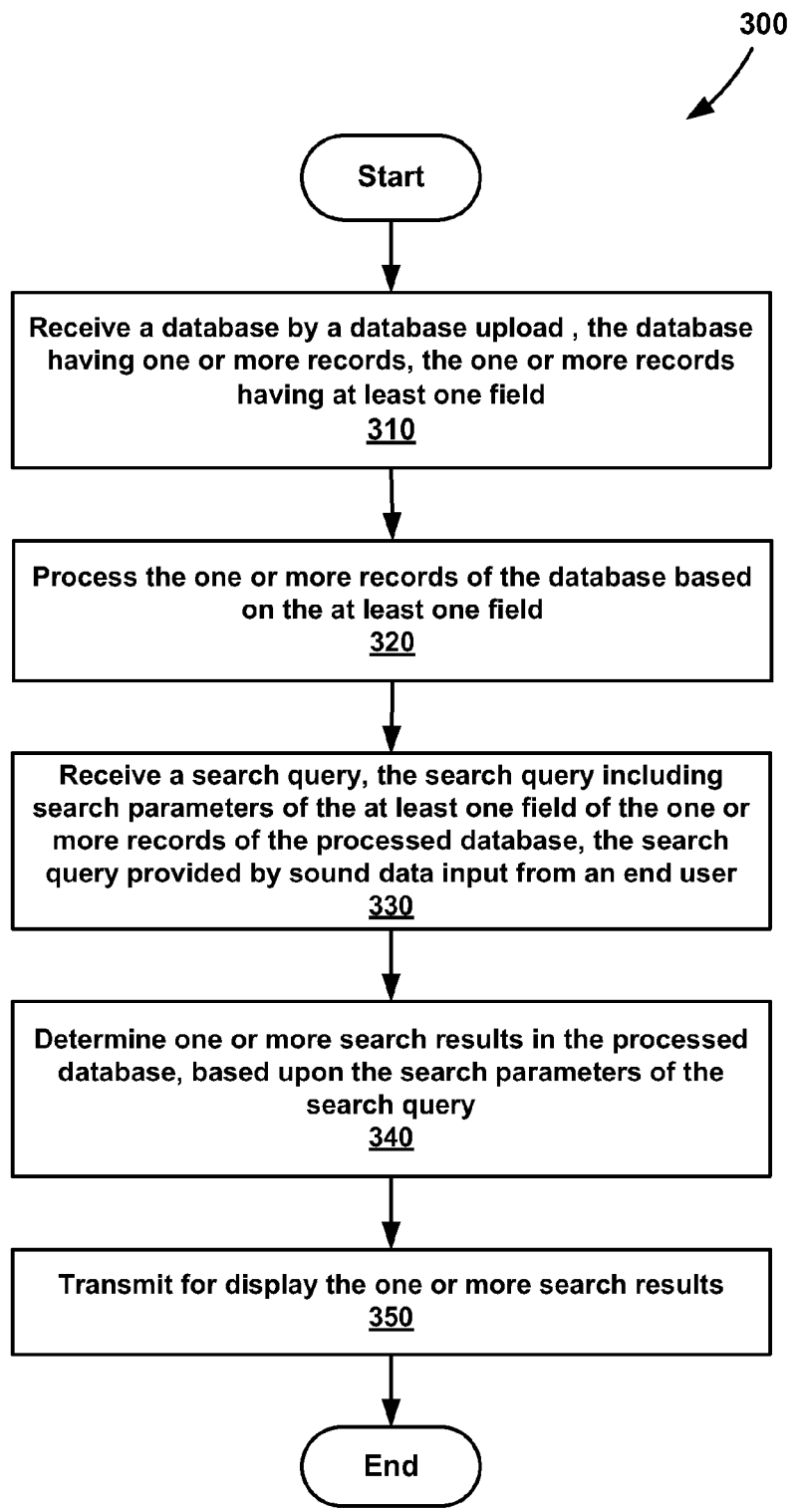
FIG. 3 is a flow chart of an exemplary method for searching a database in accordance with various embodiments of the present invention.

FIG. 3 is a flowchart of an exemplary method 300 for searching a database. At step 310 of the method 300, one or more databases may be received from a service provider by a database upload via a network, where the database has one or more records and the one or more records include at least one field. When the service provider provides a web service, for example, a record may correspond to one or more web pages that include Internet content. In exemplary embodiments, the at least one field may include content associated with the one or more web pages, such as text that appears on the one or more pages, as well as images and other audiovisual content associated with the one or more web pages.

In exemplary embodiments, a record may have fields that include at least one of a destination web address field, a record description field, a record image field, and a record rich content field, or any combination thereof. The destination web address field may provide a location of the web page. The record description field may include a brief description of the Internet content associated with the web page. The record image field may include one or more images located on the web page or associated with the web page. The record rich content field may include any suitable audiovisual content associated with the web page, including, but not limited to, sound data, video data, image data, visual effects, and the like. The record rich content field may be populated with data that may be presented when the web page is accessed, or may be presented when the record is a part of a search result. Each field may be populated as desired by the service provider, thereby giving the service provider the ability to control what records in the database are provided in response to a search query while utilizing the cloud computing network. Furthermore, by providing rich content in a field associated with a record in the database, the service provider may affect how search results are presented or otherwise rendered on a user device.

In an optional step of the method 300, account information may be received from the service provider. The account information may include authentication information, billing information and contact information. The account information may be received to create an account on the search server 180, thereby allowing the service provider to utilize the search functionality described herein. Authentication information may include a name and password that provide the service provider the ability to access the appropriate account. Billing information and contact information for the service provider may be provided as well, to facilitate receiving compensation in exchange for the search functionality or search results provided by the search server 180. Further details regarding compensation and/or sales revenue related to search functionality or search results are provided later herein.

Having an account on the search server may allow a service provider to submit one or more customized databases to search server 180, and make changes to such databases when desired by the search provider. Data may be received from the service provider to add, delete, or otherwise modify the one or more records in the database, thereby providing the service provider with flexibility in managing and editing the database even after the database has been received (by the search server 180, for example). This modification may also be automated using an authenticated script in some embodiments.

At step 320 of the method 300, the one or more records of the database may be processed based on the at least one field. The processing of the database provides information regarding one or more fields that may allow the search server to compare the information for each record to search parameters of the search query. According to various embodiments, the search server may determine if there is a match, relevancy, relatedness, association or a certain type of relationship between a record and the search parameters of the search query, thereby warranting the inclusion of the record in a listing of search results returned to the end user.

For example, when the search query includes sound data, processing the database based on the at least one field may further include processing the database to produce a phonetic data for each of the one or more records of the database. The phonetic data may include variations of spoken forms of text data in the at least one field. In exemplary embodiments, the database may be processed to produce phonetic data as described in U.S. Patent Application Publication No. 2010/0121643, filed on Nov. 2, 2009, entitled "Melodis Crystal Decoder Method and Device" to Keyvan Mohajer et al., which is hereby incorporated by reference in its entirety. In such embodiments, the service providers may receive the benefit of a speech recognition search engine without having to develop the necessary technology and infrastructure independently.

Likewise, when the search parameters include text data, processing the database may include identifying keywords from the one or more fields. Furthermore, when the search parameters include image data, processing the database may include scanning one or more fields containing record image data to identify facets of the record image data for comparison with the search parameters.

In an optional step, the processed database may be stored, on the search server 180 of FIG. 1, for example. Such an embodiment may be advantageous because the search server will not be required to reprocess the database each time a search query is received, thereby potentially saving time and providing a quicker response to the search originator.

At step 330 of the method 300, a search query may be received via the network, where the search query includes search parameters of the at least one field of the one or more records of the processed database. Furthermore, the search query may be provided by sound data input from an end user. The search parameters may be facets or features of the search query. Such facets may be compared to the standardized information produced for each record when the database is processed to determine relevance of a record in the database. Search parameters may include a portion of the search query or the entirety of the search query (e.g., when the search query is text, the search parameters may be words or combinations of words within the search query). Search parameters may also be derived from the search query in some embodiments (e.g., by the search module 250). For example, when the search query includes sound data, the search parameters may include phonetic facets of the sound data, either in numeric or graphical form.

At step 340 of the method 300, one or more search results may be determined in the processed database, based upon the search parameters of the search query. The determining one or more search results in the processed database may be performed by matching the search parameters with the at least one field of the one or more records of the database, for example, or by comparing the search parameters to the information produced when the one or more databases are processed. Search results may be identified by determining which records include information that most closely resembles the search parameters. The matching may be based on similarity between the search parameters and the one or more fields. In various exemplary embodiments of the technology, search parameters may be compared against the information produced when the one or more databases are processed to identify records that are relevant, related, associated or have a certain type of relationship to that of the search parameters.

In exemplary embodiments, when the search parameters are compared with the information for a record in the database, a score may be assigned to the record based upon how similar the information is to the search parameters. The search results may then include records having the greatest degree of similarity to the search parameters (i.e., records with a similarity score that is highest or lowest, depending on how the scoring is performed).

As an example, if the processed database includes phonetic data for each record, the matching may be performed by comparing the search parameters (e.g., phonetic facets of the sound data) of the search query with the phonetic data for each record to determine matches that fall within a predetermined tolerance. If the matching record has greater than the predetermined tolerance of similarity to the search query, then the matching record may be included within the search results.

In various embodiments, the search query may also include a command. The method may further include the optional step of performing a search action of the database based upon the command. The command may provide a way for an end user to further customize and/or narrow search results. The command may take the same form as the search query (e.g., spoken words, text, etc.), or may take a different form. For example, the command may include restricting the search results to the ten most similar records in the one or more databases, or may include restricting search results to a specific geographic location. The search server may recognize the command as an additional search parameter, and implement the command by performing the specified action in various exemplary embodiments.

At step 350 of the method 300, the one or more search results may be transmitted for display to the end user via the network. As stated hereinabove, the one or more search results may be transmitted to the service provider, or may be provided to the end user on a user device. The search results may be provided in a list form, or any other suitable form, and may be rendered together or one-by-one on a display for the end user. Also, the fields of the records included within the search results may also be transmitted for display to the end user. For example, search results may include thumbnail images for each record displayed, where the thumbnail images are stored in a field in the database for each record.

Various methods may be utilized to organize the one or more search results for when the search results are displayed to the end user. For example, the at least one field for each record may include ranking priority. The ranking priority may be assigned by the service provider, and may be based on a desired search result order. The one or more search results may then be organized based upon the ranking priority.

Embodiments utilizing ranking priority may be advantageous because the service provider may then be able to present search results in a desired order by merely providing a ranking priority in the one or more databases to be searched. For example, if the database includes names of actors as records, it is likely that multiple actors may have the same name. By using a ranking priority field, the service provider may indicate that more popular actors having a given name is provided to an end user before lesser known actors having the same name. By assigning the highest ranking priority to the most popular actor, the service provider may affect the search results while utilizing the cloud computing network for searching the one or more databases.

It will be appreciated by one skilled in the art that the method 300 may allow service providers to utilize the cloud computing network to provide search functionality for one or more databases. That is, the technology allows for the delivery of search and monetization functionalities to service providers, including software developers. To facilitate utilization of the search server, application programming interfaces ("APIs") and software development kits ("SDKs") may be provided to service providers. Furthermore, by allowing service providers to index and organize the one or more databases in the computing cloud, the method 300 may provide search functionality without having to create an index to the one or more databases independently. Furthermore, in exemplary embodiments, by allowing service providers to index their data in the exemplary cloud systems presented herein and by utilizing this technology to search by voice, database search results will be transmitted faster and more accurately than a conventional two-step process of voice to text conversion followed by a text search.

In addition to providing search functionality for databases provided by service providers, a search server (such as the exemplary search server described herein) may provide standalone search engine capability. To do so, the databases that are accessible by the search server and the information produced when the one or more databases (or indices) are processed may be aggregated to produce an aggregated processed database. An end user may then use a search engine user interface to provide a search query to the aggregated processed database. The search engine user interface may use any suitable interface. In various embodiments of the present technology, the search engine user interface may be actuated using a single button in various embodiments. As a result of user input via a search engine user interface, the aggregated processed database may be searched and search results may be transmitted for display to the end user. One exemplary method for searching the aggregated proceeded database is provided herein in the method 300.

Figure 4:
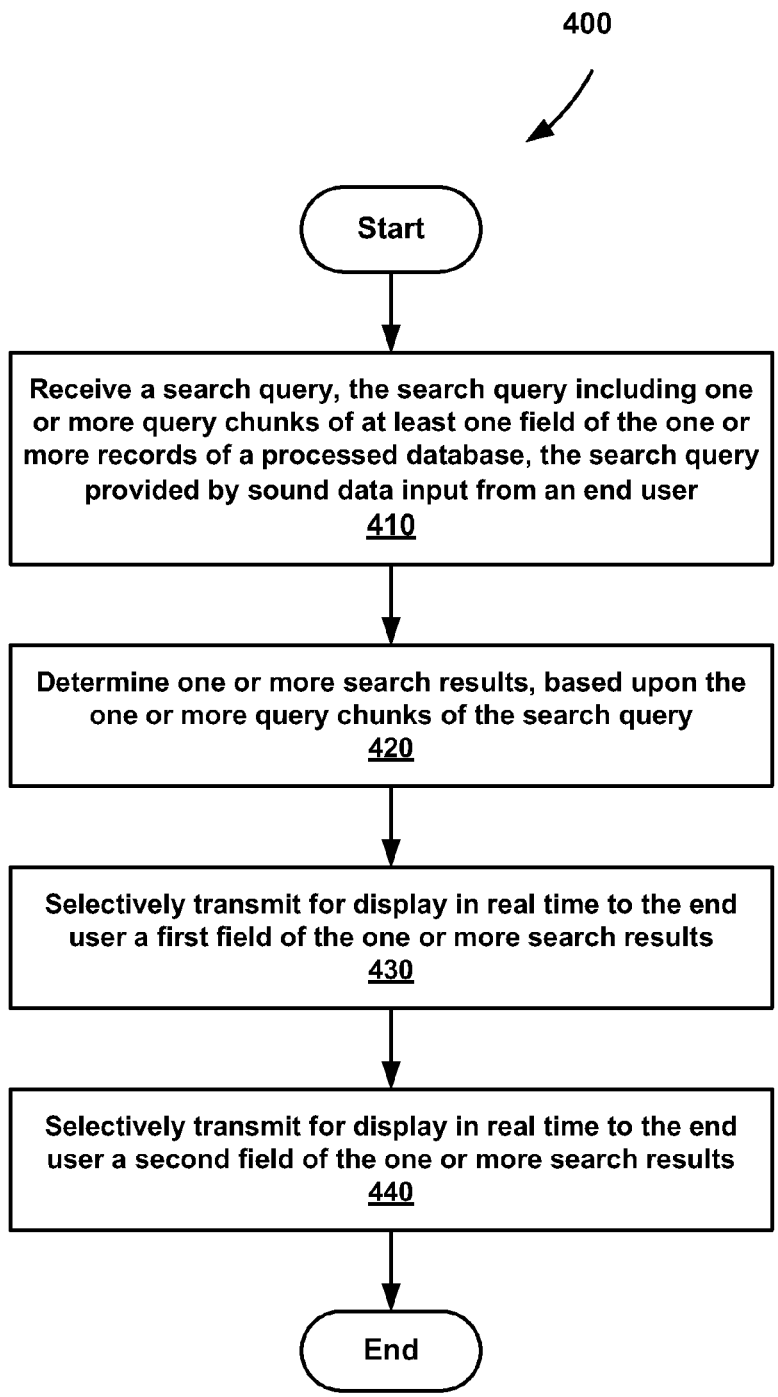
FIG. 4 is a flow chart of an exemplary method for providing search results in accordance with various embodiments of the present invention.

FIG. 4 is a flowchart of an exemplary method 400 for providing search results. At step 410 of the method 400, a search query may be received via a network. The search query may include one or more query chunks, as described above, and the search query may be provided by sound data input from an end user. The search query may be divided into query chunks before being received by the search server in some embodiments (e.g. the search query may be divided by the client, and/or by the service provider). However, the search query may also be divided into chunks by the search server when received, and the present technology is not limited in this regard. Notably, the query chunks may be sent over a two-way connection between the search server and the search originator. Such a two-way connection may be advantageous because the search query may be sent to the search server in one or more query chunks in real time as the search query is collected from the end user.

The one or more query chunks may include at least one field of the one or more records of a processed database, where the database may be processed as described above. By including at least one field, search process may be expedited in an exemplary embodiment. For example, text data from the search query may be transmitted in a query chunk before chunks related to sound and/or image content, which may allow the search server to process and return results for the text data portions of the search query before or while the sound and/or image content are being received and/or compared to records in the database. Such embodiments may increase search speed and enhance the end user experience by reducing the effects of network latency and transmission delay.

Also, when the search query includes sound and/or image data, dividing the search query into query chunks may further expedite the search process. The query chunks may be of substantially equal size, or may be of varying sizes depending upon the requirements and preferences of the search provider. Dividing the search query into chunks may allow the search server to process received query chunks and provide search results without having to wait for the entire search query to be received. Such embodiments may enhance the end user's search experience, particularly when the search query includes large amounts of sound and/or image data.

At step 420 of the method 400, the one or more search results may be determined in the processed database, based upon the one or more query chunks of the search query. The one or more search results may be determined using received query chunks, which as described above may lead to increased search efficiency since the search server does not need to wait until the entire search query has been received before determining search results. Search parameters may be derived and/or extracted from the query chunks and compared to information from records in the processed database.

As described above, search results may be determined based upon the search parameters of the query chunks. In various embodiments, the search results may be refined as subsequent query chunks are received by the search server. For example, a list of search results may be determined using a first query chunk. The list of search results may be reordered when a second query chunk is received by searching the search results using search parameters from the second query chunk. Such an embodiment may provide a search result list more efficiently by not requiring searching the entire database using each query chunk.

At step 430 of the method 400, one or more fields of the one or search results may be selectively transmitted for display in real time to the end user, via the network. Each field of a record may include a different type of data, such as text data, sound data, and rich content, as described above. The selective transmission of one or more fields may take place by, for example, selecting fields that are relatively smaller in size compared to other fields. By selectively transmitting one or more fields of records within the search results, the search server may transmit fields containing data that is relatively smaller in size compared to data in additional fields. Fields containing relatively smaller data, such as text data, may be transmitted across the network more efficiently than if data in additional fields were transmitted. By providing search results more rapidly, the user search experience may be enhanced.

For example, the selectively transmitted field or fields of the one or more search results may include text, which may advantageously provide a user with search results more rapidly than if the user were required to wait for additional fields (such as image and sound data) to be loaded before receiving the search results on a display. The one or more search results may be organized in a search result list, which may be presented to the end user so that the end user may have multiple results to select from. Each of the one or more search results may be rendered to the end user one by one, to further expedite the receiving of search results, rather than waiting for all search results to be received before rendering on the display.

At step 440 of the method 400, one or more additional fields of the one or more search results may be selectively transmitted for display in real time to the end user via the network. The additional field or fields of the one or more search results may include one or more images, and/or rich content in various embodiments. The additional fields may enhance the search experience by providing audiovisual content that stimulates the user and makes the search experience more rewarding.

Rich content may be used to enhance the presentation of the search results and/or search result list. Rich content may be provided for each record by the service provider, or may automatically be provided by the search server. Examples of rich content may include sound and/or visual effects, images, animation, video content or any combination thereof. There are numerous ways that the rich content may be used to enhance the user experience. For example, search results may be presented with audio brackets that cause sound effects to be played when actuated by a user. Sound effects may be utilized while loading rich content and/or loading a list of search results. The rich content may also be used to assist in the presentation of search results, by using a transparent overlay, or by using futuristic graphics and/or graphical effects to accompany the presentation of one or more records within the search results. For some computing devices (such as the iPad), convenient applications or applets may be presented on a first portion of the display (such as the left hand side of the display), while a list of search results may be presented on a second portion of the display (such as the right hand side of the display).

The rich content of the one or more search results may be transmitted and/or downloaded in the background (such that the rich content is not displayed to the end user), while the selectively transmitted field or fields of the one or more search results are displayed to the end user, thereby allowing the end user to view the search results while the rich content is being loaded. Additional rich content, such as video animations may be played for the end user while search results and/or the rich content are being loaded to further entertain and engage the end user. After the selectively transmitted field or fields of the one or more search results has been displayed to the end user, the rich content of the one or more search results may then be displayed to the end user.

Figure 5:
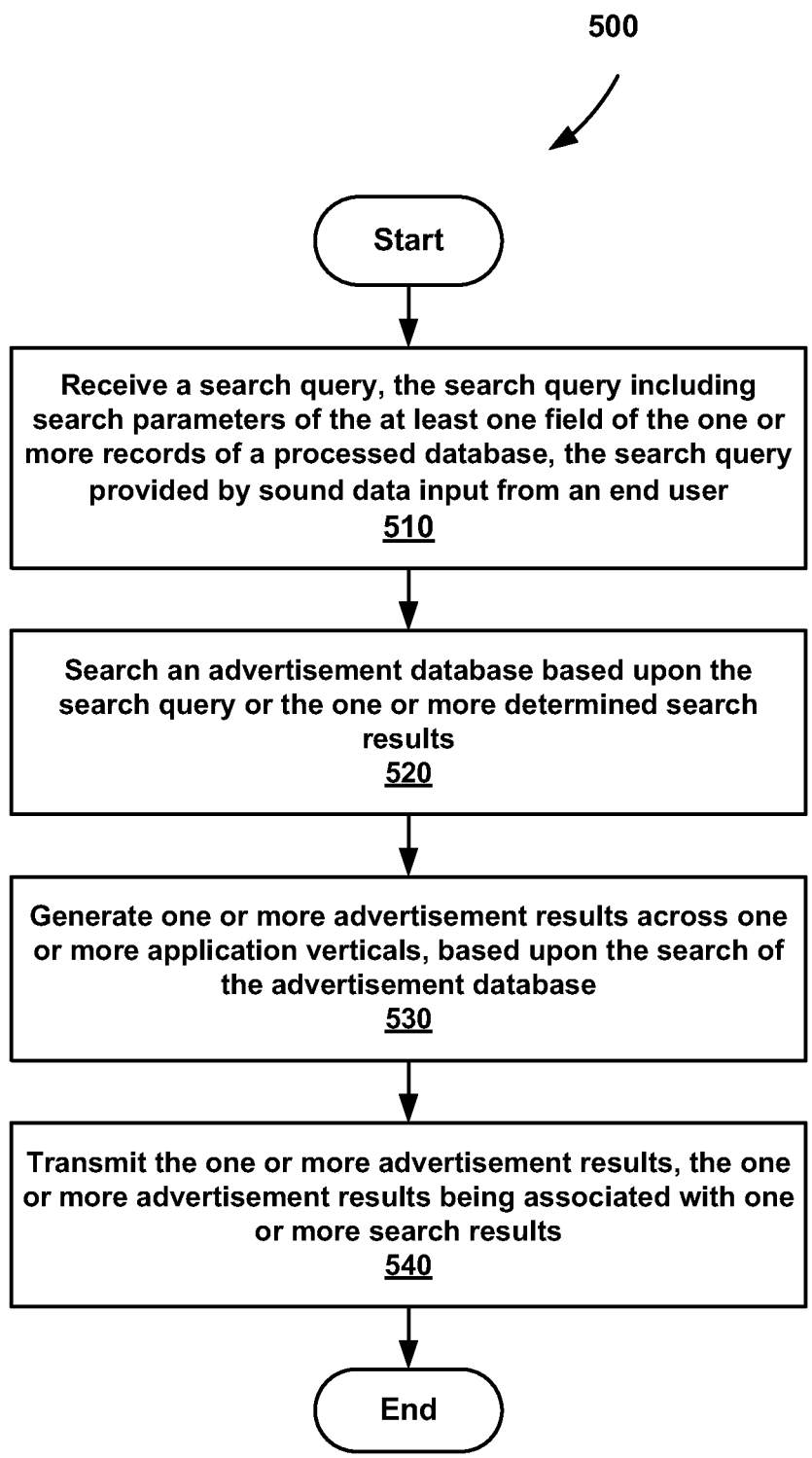
FIG. 5 is a flow chart of an exemplary method for providing advertising in accordance with various embodiments of the present invention.

FIG. 5 is a flowchart of an exemplary method 500 for providing advertising in one or more search results. At step 510 of the method 500, a search query may be received for one or more application verticals via a network, the search query comprising search parameters of the at least one field of the one or more records of a processed database. The search query may be provided by sound data input from an end user using a user device. A vertical application may be an application defined for a narrowly defined market or content area, such as an application for locating restaurants, or an application for viewing content regarding movies, for example. A vertical application may be owned and/or controlled by a service provider 130. The receiving of the search query may be performed as described above. The search query may be directed towards a vertical application, which may be the service provider associated with the processed database. The search query may be processed, and search results may be transmitted as well, in accordance to method 300 described above in various embodiments.

At step 520 of the method 500, an advertisement database may be searched based upon the search query or the one or more determined search results (e.g., the search results determined in step 340). The advertisement database may also be searched based upon a search history that comprises historic search parameters in some embodiments. The search history may include one or more historic search queries, each having associated historic search parameters. The historic search parameters may reflect network use tendencies of an end user, such as web sites frequently visited by the end user, search queries frequently received from the end user, and the like.

The search history may include various combinations of historic search queries tailored to affect the search of the advertisement database. The search history may include the search parameters of the search query, for example, so that the advertisement results are tailored to reflect the search query. The search parameters may be used alone, or in combination with other historic search parameters to search the advertisement database.

In some embodiments, the search history may include search parameters from all search queries associated with a single service provider (e.g., the service provider associated with the processed database, or a service provider that has negotiated for the right to provide advertisement on searches of the processed database). Such an embodiment may be advantageous because advertisement results may be provided that are more relevant to the user's search query, thereby enhancing the search experience while monetizing the search experience for advertisers.

In further embodiments, the search history comprises search parameters from all search queries associated with a plurality of service providers. Such embodiments may provide the end user with a variety of advertisements reflecting the end user's preferences, as reflected in the historic search parameters. Again, such an embodiment may be advantageous because advertisement results may be provided that are more relevant to the user's search query, thereby enhancing the search experience while monetizing the search experience for advertisers.

At step 530 of the method 500, one or more advertisement results may be generated across the one or more application verticals, based upon the search of the advertisement database. In various embodiments, the advertisement results may be targeted based on a current search result, where the current search result is from the processed database and is provided in response to the search query. The advertisement results may also be targeted based on user demographics (e.g., from an end user profile submitted to the search server), user interest, activity history of a user on the Internet service, or any combination thereof. The revenues generated from advertising may be shared with service providers and other parties involved using, for example, service provider accounts such as service provider account 150.

At step 540 of the method 500, the one or more advertisement results may be transmitted via the network (e.g., for display to the end user). The one or more advertisement results may be associated with one or more search results, as described above. The advertisement results may be transmitted in an advertisement list, for example, organized in order of relevance to the historic search parameters. The advertisement list may be presented in any suitable fashion, such as in a separate area of a search results page that includes search results from the processed database transmitted in response to the end user's search query.

Also, the methods and/or steps described herein may be combined. For example, the method 300 may be combined with the method 500 to provide search results and advertisement results in various embodiments.

In an optional step, the method 500 may further include organizing the one or more advertisement results based upon a bid value associated with each advertisement result. Each advertisement result may be associated with an advertiser. Within the advertisement database, which includes records having at least one field for each record, there may be a field for bid value. When a record in the advertisement database is included in the advertisement results, the advertisement results may be organized such that, for example, records having higher bid values may be located earlier in the advertisement results. Organizing the advertisement results based upon bid value fields may advantageously promote competition among advertisers in the advertisement database, who may wish to increase a bid value associated with a given record to increase visibility of that record within the advertisement results.

Bid values may be associated with keywords in various embodiments. When a keyword within search parameters of the search query is used to search the advertisement database, multiple advertiser records may be included in the advertisement results. By bidding higher than a competitor on the keyword, a service provider may promote its service and related products/offerings by causing the service provider to appear more prominently within the advertisement results (e.g., by placing the service provider's advertisement higher in the advertisement results, or by highlighting the service provider's advertisement using images or rich content). Thus, keyword bidding system may be offered to the advertisers to promote their applications and offerings based on search parameters and/or search terms.

Advertising provided with search results may provide many ways of monetizing the functionality provided to service providers. Revenue may be provided to a provider of the search server described above based on a pay-per-click model. Advertisers participating in the advertisement database pay a predetermined amount when end users click on an advertisement in the advertisement results. Revenues generated from the advertisements on search results of a service provider's processed database may be shared between the service provider and other parties involved.

According to some embodiments, the search server 270 may employ a natural language query processor, hereinafter "NLQP 280," to search databases by sound input. More specifically, the NLQP 280 may be utilized to generate aggregated natural language libraries and process natural language queries using the generated libraries. Generally speaking, the NLQP 280 may generate an aggregated natural language library from a plurality (e.g., two or more) of natural language libraries. The plurality of natural language libraries may be generated by a plurality of developers (e.g., service providers) that develop client applications, where each developer may generate a natural language library for a specific client application. An application developer may desire to enable speech recognition functions within their applications that allow end users to interact with the application using spoken commands. In order to provide accurate responses to spoken queries provided by end users of the application, the developer may generate a natural language library for the application. In other instances, the developer may utilize the aggregated natural language library generated by the present technology.

According to some embodiments, the NLQP 280 may manage individual or unique (e.g., rather than aggregated) natural language libraries for each service provider. The individual natural language library may be customized to the specific needs of the service provider and/or the clients of the service provider. For example, a travel website may employ a different customized natural language library relative to a music website. Additionally, the customization of natural language libraries may encourage competing service providers to generate more robust and response natural language libraries.

Broadly speaking, a natural language library may include natural language queries that would be commonly encountered by the application, along with a response or action that should be executed by the application when the query is received. The developer may pre-load the application with the natural language library to process these commonly encountered natural language queries.

According to some embodiments, some of these natural language libraries may comprise a developer generated library. A developer generated library may include a topic or subject-matter that has been associated with the library via the developer. For example, the developer may manage a navigation application. Thus the natural language library associated with the application may have a subject matter of "navigation" attributed thereto. In some instances, the developer generated library may include a plurality of topics associated therewith.

These natural language libraries may be somewhat limited because developers or natural language processing systems may not properly anticipate various permutations inherent in natural language queries. For example, a simple natural language query such as "What time is my next appointment?" may also be expressed as "When is my next appointment?" or "My next appointment is when?" and so forth. If the developer has not accounted for some of these permutations, the natural language queries may not be fulfilled.

According to other embodiments, rather than a list of natural language queries and responses, a natural language library may comprise a rule-based schema that is trained on natural language queries and responses. As such, the natural language library may more closely correspond to a programming language than a list of question and answer pairs. For example, the present technology may analyze several permutations for the same natural language phrase that when answered, generate substantially the same response. Using these questions and response, the present technology may abstract, out of that information, a methodology for dealing with future similar natural language queries. By way of non-limiting example, the presence of the word "next" and "appointment" when located within two or three words from one another in a natural language query may indicate to the system that end user wants some type of information regarding their next temporally subsequent appointment. Also, the presence of the word "when" in the natural language query may inform the system that the end user is asking a time related question. This information may be combined into a rule-based schema for processing future similar natural language queries.

In order to reduce the likelihood that a natural language query may go unanswered/unfulfilled, a natural language library, generated by the NLQP 280, may be utilized. Again, this library may be generated either from a plurality of natural language libraries, or may also comprise a customized natural language library. These types of natural language libraries provide a more robust and comprehensive set of information relative to list oriented natural language libraries. That is, the natural language library may contain rule-based representations of natural language queries because the library is not limited to natural language query and response pairs.

Developers or natural language processing systems may then access and utilize an aggregated natural language library rather than their limited natural language library and derive the benefit of a larger corpus of information. In other instances, developers or others may be incentivized to generate robust and customized natural language libraries to better serve the natural language queries of their customers.

In some embodiments, the NLQP 280 may employ crowdsourcing to generate an aggregated natural language library from content generated by many separate service providers/developers.

Once natural language libraries have been received by the NLQP 280, the NLQP 280 may process each natural language library to determine how best to integrate the contents of the individual libraries into an aggregated natural language library. As mentioned above, a natural language library may be associated with a particular application, service provider, and/or developer that utilize the library.

In some instances, the application is directed to providing some type of information, service, or product to an end user. Moreover, as mentioned above, the natural language library may comprise natural language queries and associated responses. For example, a natural language query may include "Search for the nearest gas station" while the response associated with that query includes a command or action, and possibly associated data, that is understandable by a mapping or navigation application querying an information source to determine the nearest gas station proximate the location of the end user. The results may be returned to the end user via a graphical user interface that comprises a map and pinpointed locations on the map. Advantageously, each natural language query in the natural language library may be associated with at least one response. Additionally, several natural language queries may be associated with the same response to deal with the variability inherent in natural language queries, such as when two differently worded queries are asking the same question.

With respect to the response that is generated by the NLQP 280, a response format may also be customized depending on the application that employs the NLQP 280 as well as the needs of the developer and/or service provider. By way of non-limiting example, a natural language query of "play the third track in the first Mariah Carey album" may cause a music player application to return a response that is a combination of actions and meta-data. The action may be "play", the meta-data may comprise Artist: Mariah Carey, Album: Emotions, Track: Can't Let Go. The developer can use the combination of the action (i.e. play) and meta-data to executed the desired command via the music player application. This example is descriptive and illustrative of the fact that responses may be customized depending upon the context of the natural language query or the needs of the service provider/developer. For example, if the service provider prefers to sell new music to the end user, rather than returning the meta-data described above, the service provider may choose to have a link to other Albums from other Artists that may be of interest to the end user based upon their query.

The NLQP 280 may receive natural language libraries from disparate sources and, utilizing the information contained in the libraries, generate an aggregated natural language library.

In some instances, the NLQP 280 may generate aggregated natural language sub-libraries that provide natural language query processing for specific applications. That is, a plurality of natural language libraries for different navigation applications may be combined together (e.g., aggregated) to generate a more comprehensive natural language library that may be utilized by the related navigation applications. Additionally, other similar applications may also utilize the aggregated natural language library, even if the application is not directly associated with aggregated natural language sub-library. For example, a reservation application may receive location-based natural language queries, which could be processed by a navigation application.

In some instances, the natural language sub-libraries may comprise individual customized natural language libraries for different service providers.

According to some embodiments, developers may be compensated for participating in the generation of the aggregated natural language library by providing and/or updating their individual natural language libraries.

As mentioned earlier, a natural language library may be associated with a particular service provider, and by extension, a particular type of subject matter. For example, a navigation application that provides navigational services may utilize a particular natural language library. Therefore, the subject matter of the natural language library may be associated with the service(s) provided by the application. The NLQP 280 may determine the subject matter associated with the natural language library by detecting keywords included in the natural language library queries or responses. In other instances the natural language library may be tagged with identifying information.

Regardless of how the NLQP 280 determines the service/subject matter associated with the natural language query, the NLQP 280 may group or combine the contents (queries and responses) for similar natural language libraries together into a single natural language library. The establishment of aggregated (and individual, customized) natural language libraries may increase the search efficiency of the NLQP 280, as will be discussed in greater detail below.

After the establishment of aggregated natural language library, and in some instances, natural language sub-libraries, the NLQP 280 may receive queries from end users via their client devices. In other instances, the queries may be received from a service provider application that supports natural language query processing (e.g., the developer applications).

In accordance with the present technology, the query may comprise sound data input, such as a spoken natural language query. The natural language query may comprise any request that is recognizable and/or actionable by the application and/or device that receives the natural language query. Continuing with the example set forth, a natural language query of "Locate the nearest gas station" may be received by a client device that executes a navigation application in conjunction with the NLQP 280. A voice capturing device such as a microphone, which is associated with the client device, receives the sound data input (e.g., spoken natural language query). The sound data input may be transmitted by the client device to the search server 270, sometimes via the navigation application In other embodiments, a natural language query application executing on the client device may transmit the sound data input instead of the navigation application.

Once the natural language query is received, the NLQP 280 may compare the content of the natural language query to the aggregated natural language library to determine if the query corresponds to at least one query included in the aggregated natural language library. The NLQP 280 may utilize the entire phrase of the natural language query, or in some embodiments, only a portion of the natural language query.

As mentioned above, because the aggregated natural language library may comprise aggregated natural language sub-libraries, the natural language query may be compared against one or more of the aggregated natural language sub-libraries, rather than against the entire aggregated natural language library. The NLQP 280 may determine the subject matter associated with the natural language query by locating keywords or phrases included in the query. The NLQP 280 may select one or more aggregated natural language sub-libraries that are to be queried against based upon this determined information. Allowing the natural language query to be searched against a smaller subset of the entire aggregated natural language library may increase the efficiency of the search process and decrease application latency experience by the end user.

If the NLQP 280 locates a query in either the aggregated natural language library or an aggregated natural language sub-library, the NLQP 280 may obtain the response associated with the query. It will be understood that the response that is obtained may include not only the actual response that was generated by the service provider application, but the methodology for generating the response. For example, if a first navigation application is to utilize a response for a certain natural language query generated by a second navigation application, it may be beneficial to understand how the response was generated, rather than the actual response. If the first navigation application receives a natural language query of "Where is a close library?" and the first navigation application is unable to process the natural language query, the first navigation application may provide this natural language query to the NLQP 280. A corresponding query generated by the second navigation application may be located by the NLQP 280 in an aggregated natural language sub-library for navigation applications.

As an aside, it may provide little benefit to the first navigation application to receive the actual search results that were generated for this particular query, because the location information for the end user may be different from the location information for the end users that generated the natural language query that was processed by the second navigation application. Thus, a more valuable response would comprise how the second navigation application fulfilled the query, such as how the second navigation application interpreted the query, the database of information that was accessed, how the location information for the end user was obtained, and so forth. In sum, the responses that are stored in the aggregated natural language library may include many types of information that may assist the NLQP 280 in fulfilling similar natural language queries for other applications.

The comparisons performed by the NLQP 280 may not always result in completely perfect matches for natural language queries. Advantageously, the NLQP 280 may be configured to allow for matching of natural language queries when there is a substantial similarity (or at least some similarity) between the natural language query received from the end user and a natural language query that is included in the aggregated natural language library. For example, an end user natural language query "What times it?" may substantially correspond to a natural language query of "What time is it?" in the aggregated natural language library. The NLQP 280 may infer that these two queries are substantially similar because they were both received by a calendaring application. These types of fuzzy matching between received and stored queries allow the NLQP 280 to provide responses in instances where requiring an exact match would produce an error.

According to some embodiments, the NLQP 280 may be utilized to enhance the accuracy of a speech recognition system by narrowing down possibilities in a language model to a smaller set. Again, individuals may express natural language queries an almost infinite number of ways, even when attempting to achieve the same response. Moreover, each natural language query may be subject to a large number of interpretation possibilities due to word choice, language, syntax, and/or grammar—just to name a few. According to some embodiments, the NLQP 280 may be utilized to narrow down the possible interpretations of the natural language query. The NLQP 280 may return a list of one or more possible interpretations for the natural language query.

As with many other types of information described herein, the individual customized natural language libraries, the aggregated natural language library, and the aggregated natural language sub-libraries may be stored in a storage component such as the one or more databases 170 of FIG. 1.

In some instances, the NLQP 280 may not be able to determine a response for the natural language query because no correspondence between the natural language query and entries in the aggregated natural language library can be found. In these instances, the NLQP 280 may provide the natural language query to a plurality of service providers (e.g., developers) in an effort to generate an appropriate interpretation for the natural language query. In some instances, the NLQP 280 may allow for crowdsourcing for the interpretation of the query, along with the response.

According to other embodiments, the NLQP 280 may receive natural language queries from the end user client device. When the natural language query is compared against the aggregated natural language library and a matching query is located, the NLQP 280 may direct the natural language query to service providers, such as developer applications, associated with the matching query. In these instances, the NLQP 280 acts as a routing mechanism for directing natural language queries to applications or service providers that are best suited to fulfill the natural language query. Thus, the more robust the natural language library is for a service provider, the more likely the service provider will have natural language queries directed to them, increasing their opportunities to fulfill requests, engage with potential customers, and generate revenue. Correspondingly, as service providers create more robust natural language libraries, the content of the aggregated natural language library increases.

In some instances, service providers may retain their own natural language library. The library may be periodically modified as new natural language queries are received and fulfilled. To increase the content of the aggregated natural language library, the service providers may upload their natural language queries to the NLQP 280. In other embodiments, the NLQP 280 may communicate with the service provider to detect changes in the natural language library of the service provider. Each time an entry is added to a natural language library and detected by the NLQP 280, the aggregated natural language library may be updated.

In accordance with the present disclosure, the NLQP 280 may employ a crowd sourcing development interface that allows developers (e.g., service providers or other contributors) to choose to make their natural language libraries available to others. Advantageously, other developers can then use these shared libraries in their service.

Developers can submit a particular natural language query sample that is received by the NLQP 280 (for example, by typing in the a text box on a website, or by submitting the query to an API, or even by speaking it to an interface) and in response the NLQP 280 may generate a set of all the other libraries that matched all or part of the sample query. When the set of matched libraries is returned by the NLQP 280, the developer can see a description of the libraries and other use cases that they support. Then the developer can choose to use some or all of the matched libraries to design/update their natural language query system. Thus, developers can reduce duplicative effort by employing these crowd sourced natural language libraries.

By way of non-limiting example, a developer might want to design a system that calculates the day of a week that corresponds to a particular date. The developer may submit a sample query such as "tell me what day of the week is Jan. 14, 2012." The NLQP 280 may indicate that "tell me" matched an existing natural language library that covers other queries such as "please tell me," "I want to know," "I would like to know," "I wanna know," and so forth. The developer can choose to use this library to cover all (or a substantial portion) the cases that correspond to the meaning of "tell me." In this example, the date "Jan. 14, 2012" could also match a natural language library that covers dates with different date format variations. Thus, the developer does not have to create a system that understands dates from scratch and can build on top of the work that is already done by others.

The development environment can become more sophisticated and can automatically detect what the developer is typing and in real time or in the background make suggestions to the developer about the existing libraries that match and are available for use. For example, even if the developer is not looking for existing libraries, as soon as the developer types in the words "tell me" the NLQP 280 can alert the developer that there are existing libraries that can be used to cover this and similar set of queries.

Additionally, when the NLQP 280 presents matching libraries to the developer, it is also possible to present a measure of popularity for each library. For example, if the libraries are being used in a service with live traffic, a popularity measure that corresponds to the number of hits to each library in a given time period could be presented. Advantageously, these metrics allow the developer to better decide which library to use.

In some embodiments, the NLQP 280 may allow developers to expand their libraries by induction and/or merging. For example, when two or more natural language libraries have a substantial amount of subject matter in common with one another, and/or correspond to similar services, the NLQP 280 may determine that these natural language libraries cover the same domain (e.g., subject matter). In some instances, the two or more libraries may not be identical and there could be some cases in one library that do not belong to the other and vice versa. Thus, the NLQP 280 may combine these libraries together to create a new natural language library that covers all (or a substantial portion) of cases. For example, natural language library A could cover "tell me" and "please tell me" and natural language library B could cover "tell me" and "I want to know." The NLQP 280 may automatically generate a third natural language library that comprises the phrases "tell me'," "please tell me," and "I want to know." According to some embodiments, when a user of natural language library A inputs a natural language query such as "I want to know" the NLQP 280 could provide a suitable response to the natural language query despite the fact that the developer of natural language library A did not predict that particular query input by the user.

According to some embodiments, an exemplary process of converting a speech query to text by the NLQP 280 generally involves utilizing language models to determine the most likely sequence of words that may apply to a particular query. If the language model contains smaller number of possibilities, the NLQP 280 can convert the audio query to text with higher accuracy, simply because there are fewer possibilities to choose from in the language model. In a standard speech to text system, there is generally one all-encompassing language model that applies to all queries. However, the NLQP 280 of the present technology can narrow down the language model to a smaller subset by analyzing the natural language query prior to fully converting the speech query into text, and determining the "topic" or "subject" of the query. For example, before fully converting a query from speech to text, the NLQP 280 may determine whether the query is generally related to travel, weather, calendar management, contact dialling, and so forth. Upon successfully determining that the subject of the query is travel, the NLQP 280 may then use a customized language model that only pertains to travel, therefore eliminating numerous possibilities in the other categories within the language mode and substantially reducing the number of possibilities. These functionalities may result in overall higher accuracy of the conversion of a natural language query from speech to text. Thus, these features may be apply to any speech to text system, and is therefore not limited to systems that incorporate only natural language process.

Similarly to natural language libraries, the NLQP 280 may also update the content of one or more language models utilized to process speech input and/or search queries. Thus, as the NLQP 280 encounters new types of speech input/search queries, the NLQP 280 may update the language models to reflect knowledge determined during the processing of such types of speech input/search queries.

By way of non-limiting example, the NLQP 280 may be utilized to convert a speech input to text, such as a speech input that is to be converted into an email message. An exemplary speech input may comprise, "Send an email to Larry, with subject "Lunch Meeting" and body that includes "Meet me downstairs for lunch."

The NLQP 280 may evaluate keywords or phrases included in the speech input to initially determine that the speech input is a request to transcribe an email from speech input. Again, the NLQP 280 may utilize natural language libraries and/or keyword or phraseology analysis to assist in evaluating different types of subject matter which may be included in the speech input and/or inferring a topic(s) or subject matter(s) associated therewith.

The NLQP 280 may then determine which language models are to be utilized to process the speech input. For example, knowing that the speech input is a request to transcribe an email, the NLQP 280 may select a subject line language model and a body section language model to further process the speech input into an email format, as well as other models that may be appropriate for an email communication. The NLQP 280 may compare the speech input to a language model for subject lines for emails, as well as a language model for body sections of emails.

Once the NLQP 280 determines a topic(s) associated with the two sections of the speech input, the NLQP 280 may intelligently select one or more language models that may be utilized to transcribe the speech input into text. Thus, using appropriate language models for email subject lines and body sections, the NLQP 280 may efficiently transcribe the speech input to text, according to their respective categories (e.g., subject line, body, email address, signature, etc.).

Figure 6:
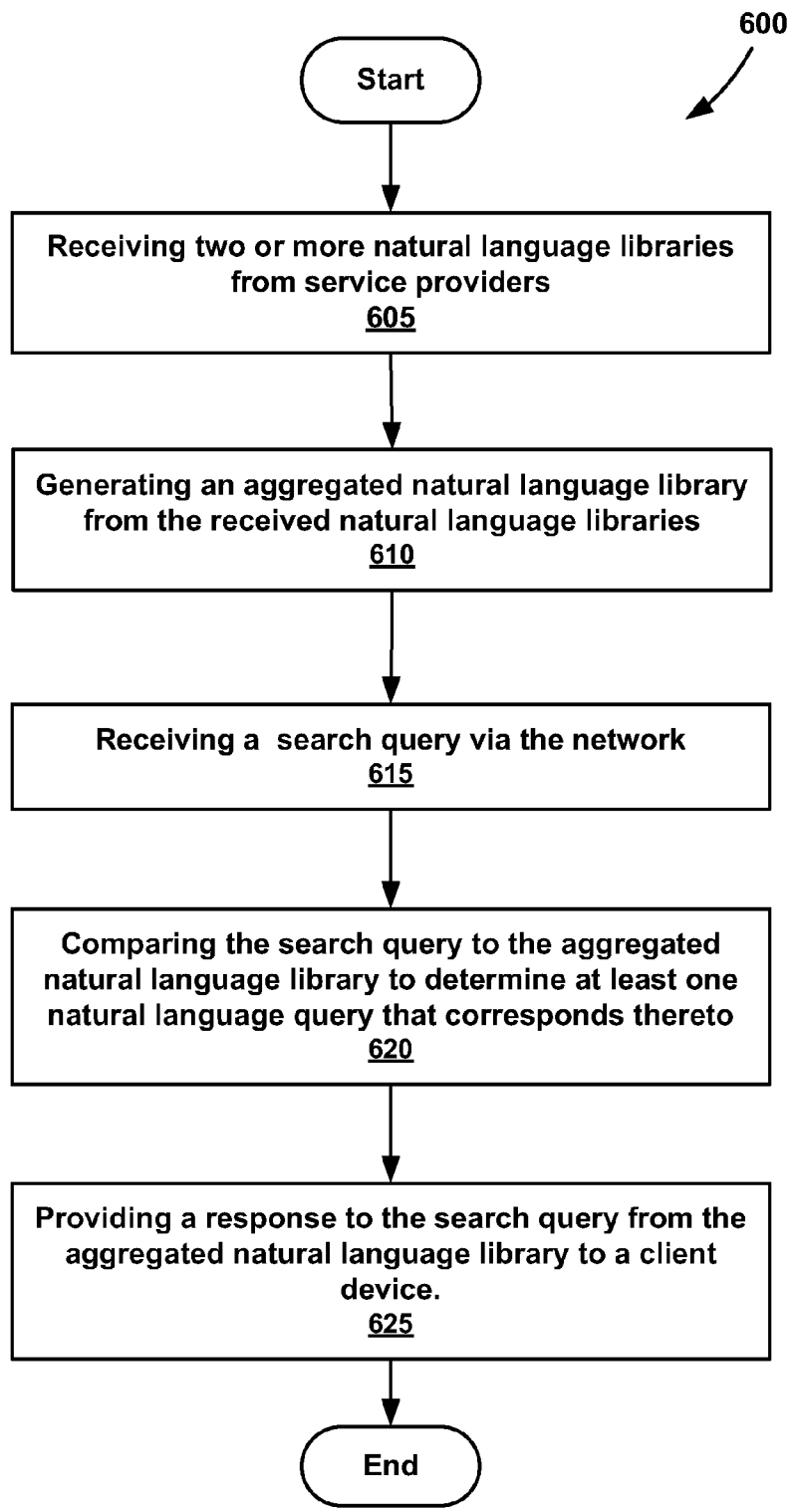
FIG. 6 is a flow chart of an exemplary method for processing natural language queries in accordance with various embodiments of the present invention.

FIG. 6 illustrates a flowchart of an exemplary method 600 for processing natural language queries. The method 600 may comprise a step 605 of receiving a plurality of natural language libraries (or sub-libraries) from service providers. It is noteworthy that each natural language library may comprise natural language queries for interacting with a client application and corresponding responses for the natural language queries.

Additionally, the method 600 may include the step 610 of generating an aggregated natural language library from the received natural language libraries. Step 610 may also include steps for generating aggregated natural language sub-libraries. Again, as mentioned above, in some embodiments the sub-libraries may correspond with individual developers, potentially customized for that developer's need or the requirements of a client application. Customization can be implemented by the developers, and may include how queries and responses are formatted, where responses may include a combination of actions and corresponding data (also metadata).

The method 600 may also include a step 615 of receiving a search query via the network. In some instances, the search query may comprise a sound-based input, and/or a natural language search query (which may or may not be sound-based). The search query may be processed to determine a topic or subject matter for the search query. In some embodiments, search query may be received from an end user client device.

The method 600 may further include a step 620 of comparing the search query to the aggregated natural language library to determine at least one natural language query that corresponds to the search query, followed by a step 625 of providing a response to the search query from the aggregated natural language library to a client device or a web-based interface.

Figure 6A:
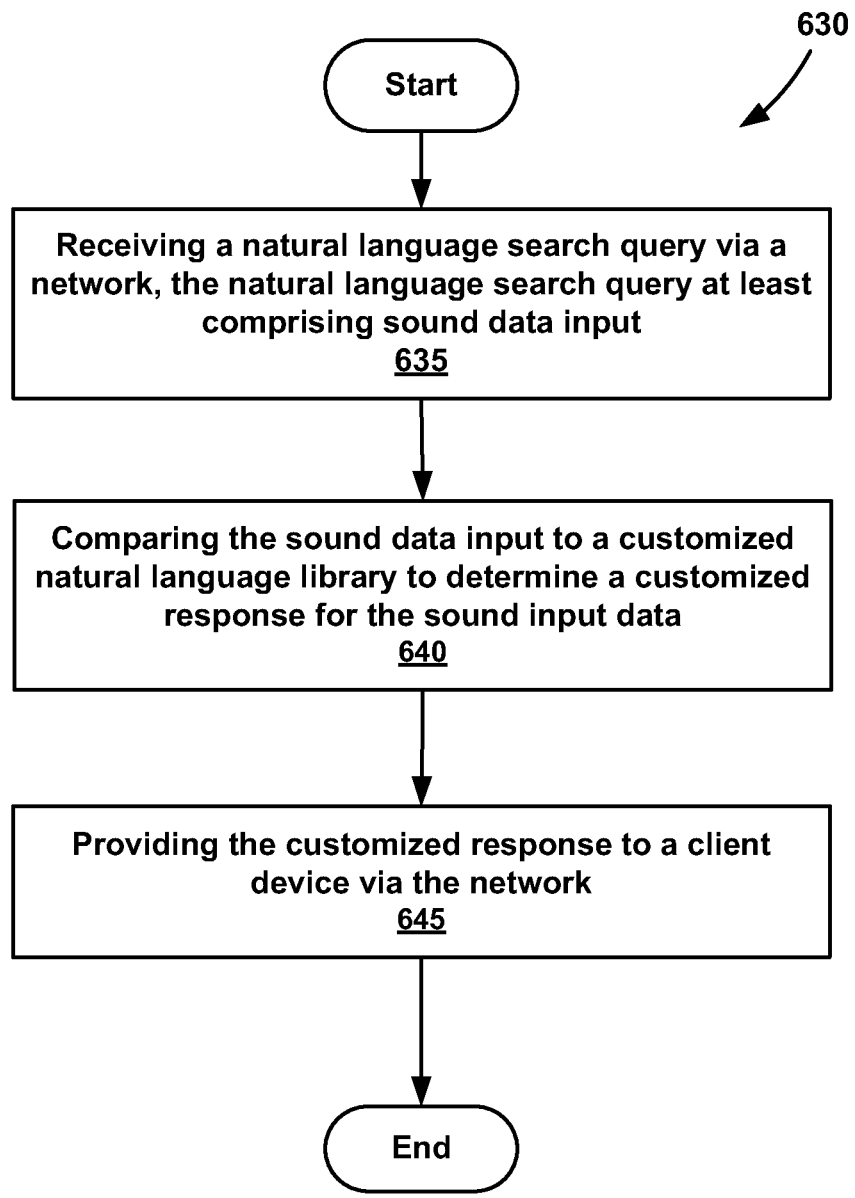
FIG. 6A illustrates a flowchart of an alternate exemplary method for processing natural language queries.

FIG. 6A illustrates a flowchart of an alternate exemplary method 630 for processing natural language queries. The process contemplated in method 630 may be generally described as a method for processing natural language queries using an individual customized natural language library, constructed as described in greater detail above. Although not shown, prior to the step of receiving a natural language search query via the network, the method 630 may comprise a step of generating a customized natural language library. Again, this library may comprise a rule-based methodology for interpreting natural language queries and providing responses thereto. Additionally, these customized natural language libraries may be specifically tailored to a client application, the preference of a service provider/developer, and/or a particular domain/subject matter. Because the present technology may encounter new natural language query phrases, the natural language library may evolve over time, becoming more robust and accurate.

In some embodiments, the natural language library that is selected by the system may comprise a natural language library that produces the most accurate response to the natural language query. Therefore, natural language library developers may be incentivized to create even more robust and accurate natural language libraries.

According to some embodiments, the method 630 may comprise a step 635 of receiving a natural language search query via the network, the natural language search query at least comprising sound data input. Once the sound data input has been determined, the method 630 may comprise a step 640 of comparing the sound data input to a customized natural language library to determine a customized response for the sound input data. Again, as mentioned above, the customized natural language library may comprise a rule-based model for processing natural language queries, where the rule-based model being trained on natural language queries for interacting with a client application. According to some embodiments, the natural language library may also comprise customized responses for the natural language queries that are tailored to any of the service provider and the client application.

Additionally, the method 630 may comprise a step 645 of providing the customized response to the at least one natural language query from a customized response associated with at least one natural language query included in the natural language library.

Figure 7:
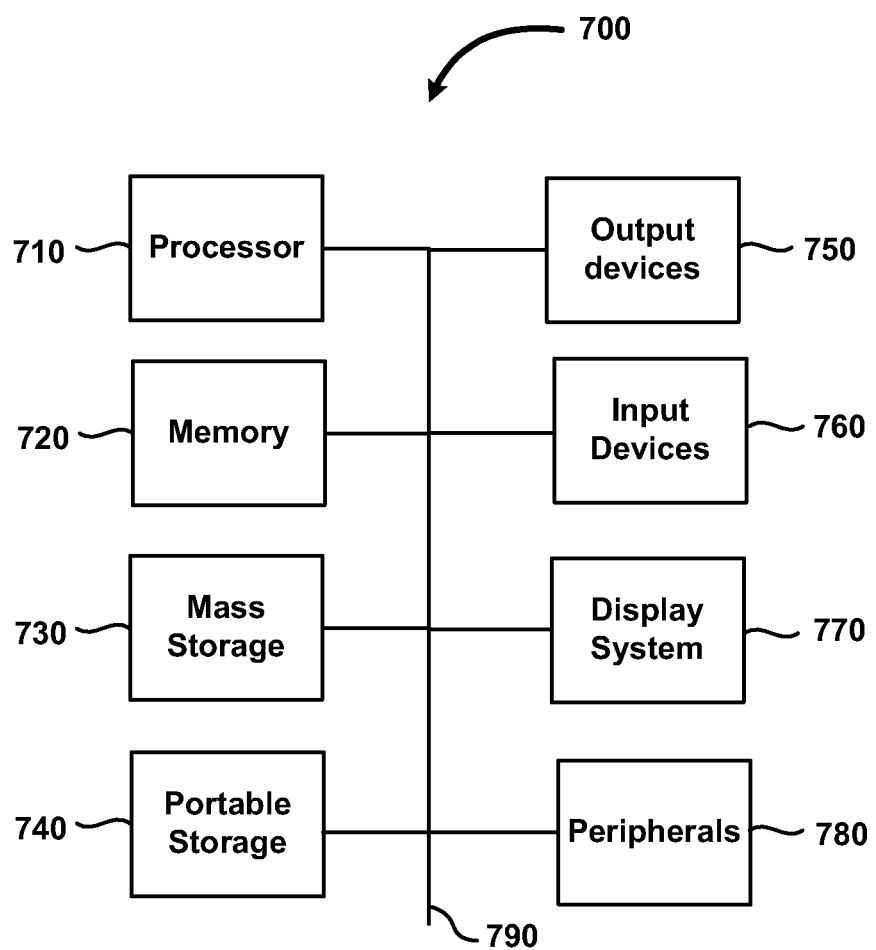
FIG. 7 is a block diagram of an exemplary system for searching one or more databases in accordance with various embodiments of the present invention.

FIG. 7 illustrates an exemplary computer system 700 that may be used to implement an embodiment of the present invention. Computer system 700 of FIG. 7 may be implemented in the context of user devices, search server 180, network cloud 140 and the like. The computer system 700 of FIG. 7 includes one or more processors 710 and main memory 720. Main memory 720 stores, in part, instructions and data for execution by processor 710. Main memory 720 can store the executable code when the computer system 700 is in operation. The computer system 700 of FIG. 7 may further include a mass storage device 730, portable storage medium drive(s) or devices 740, output devices 750, user input devices 760, a graphics display system 770, and other peripheral devices 780.

The components shown in FIG. 7 are depicted as being connected via a single bus 790. The components may be connected through one or more data transport means. Processor unit 710 and main memory 720 may be connected via a local microprocessor bus, and the mass storage device 730, peripheral device(s) 780, portable storage device 740, and display system 770 may be connected via one or more input/output (I/O) buses.

Mass storage device 730, which may be implemented with a magnetic disk drive or an optical disk drive, is a non-volatile storage device for storing data and instructions for use by processor unit 710. Mass storage device 730 can store the system software for implementing embodiments of the present invention for purposes of loading that software into main memory 720.

Portable storage device 740 operates in conjunction with a portable non-volatile storage medium, such as a floppy disk, compact disk or Digital video disc, to input and output data and code to and from the computer system 700 of FIG. 7. The system software for implementing embodiments of the present invention may be stored on such a portable medium and input to the computer system 700 via the portable storage device 740.

Input devices 760 provide a portion of a user interface. Input devices 760 may include an alpha-numeric keypad, such as a keyboard, for inputting alpha-numeric and other information, or a pointing device, such as a mouse, a trackball, stylus, or cursor direction keys. Additionally, the system 700 as shown in FIG. 7 includes output devices 750. Suitable output devices include speakers, printers, network interfaces, and monitors.

Display system 770 may include a liquid crystal display (LCD) or other suitable display device. Display system 770 receives textual and graphical information, and processes the information for output to the display device.

Peripherals 780 may include any type of computer support device to add additional functionality to the computer system. Peripheral device(s) 780 may include a modem or a router.

The components contained in the computer system 700 of FIG. 7 are those typically found in computer systems that may be suitable for use with embodiments of the present invention and are intended to represent a broad category of such computer components that are well known in the art. Thus, the computer system 700 of FIG. 7 can be a personal computer, hand held computing device, telephone, mobile computing device, workstation, server, minicomputer, mainframe computer, or any other computing device. The computer can also include different bus configurations, networked platforms, multi-processor platforms, etc. Various operating systems can be used including UNIX, Linux, Windows, Macintosh OS, Palm OS, and other suitable operating systems.

Some of the above-described functions may be composed of instructions that are stored on storage media (e.g., computer-readable medium). The instructions may be retrieved and executed by the processor. Some examples of storage media are memory devices, tapes, disks, and the like. The instructions are operational when executed by the processor to direct the processor to operate in accord with the invention. Those skilled in the art are familiar with instructions, processor(s), and storage media.

It is noteworthy that any hardware platform suitable for performing the processing described herein is suitable for use with the invention. The terms "computer-readable storage medium" and "computer-readable storage media" as used herein refer to any medium or media that participate in providing instructions to a CPU for execution. Such media can take many forms, including, but not limited to, non-volatile media, volatile media and transmission media. Non-volatile media include, for example, optical or magnetic disks, such as a fixed disk. Volatile media include dynamic memory, such as system RAM. Transmission media include coaxial cables, copper wire and fiber optics, among others, including the wires that comprise one embodiment of a bus. Transmission media can also take the form of acoustic or light waves, such as those generated during radio frequency (RF) and infrared (IR) data communications. Common forms of computer-readable media include, for example, a floppy disk, a flexible disk, a hard disk, magnetic tape, any other magnetic medium, a CD-ROM disk, digital video disk (DVD), any other optical medium, any other physical medium with patterns of marks or holes, a RAM, a PROM, an EPROM, an EEPROM, a FLASHEPROM, any other memory chip or cartridge, a carrier wave, or any other medium from which a computer can read.

Various forms of computer-readable media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU.

The above description is illustrative and not restrictive. Many variations of the invention will become apparent to those of skill in the art upon review of this disclosure. The scope of the invention should, therefore, be determined not with reference to the above description, but instead should be determined with reference to the appended claims along with their full scope of equivalents. While the present invention has been described in connection with a series of embodiments, these descriptions are not intended to limit the scope of the invention to the particular forms set forth herein. It will be further understood that the methods of the invention are not necessarily limited to the discrete steps or the order of the steps described. To the contrary, the present descriptions are intended to cover such alternatives, modifications, and equivalents as may be included within the spirit and scope of the invention as defined by the appended claims and otherwise appreciated by one of ordinary skill in the art.

One skilled in the art will recognize that the Internet service may be configured to provide Internet access to one or more computing devices that are coupled to the Internet service, and that the computing devices may include one or more processors, buses, memory devices, display devices, input/output devices, and the like. Furthermore, those skilled in the art may appreciate that the Internet service may be coupled to one or more databases, repositories, servers, and the like, which may be utilized in order to implement any of the embodiments of the invention as described herein. One skilled in the art will further appreciate that the term "Internet content" comprises one or more of web sites, domains, web pages, web addresses, hyperlinks, URLs, any text, pictures, and/or media (such as video, audio, and any combination of audio and video) provided or displayed on a web page, and any combination thereof.

While specific embodiments of, and examples for, the system are described above for illustrative purposes, various equivalent modifications are possible within the scope of the system, as those skilled in the relevant art will recognize. For example, while processes or steps are presented in a given order, alternative embodiments may perform routines having steps in a different order, and some processes or steps may be deleted, moved, added, subdivided, combined, and/or modified to provide alternative or sub-combinations. Each of these processes or steps may be implemented in a variety of different ways. Also, while processes or steps are at times shown as being performed in series, these processes or steps may instead be performed in parallel, or may be performed at different times.

From the foregoing, it will be appreciated that specific embodiments of the system have been described herein for purposes of illustration, but that various modifications may be made without deviating from the spirit and scope of the system. Accordingly, the system is not limited except as by the appended claims.

What is claimed is:

1. A method for processing natural language queries, the method comprising:
   receiving two or more natural language libraries from service providers via a network, where each natural language library comprises:
      natural language queries for interacting with a client application; and
      responses for the natural language queries;
   generating an aggregated natural language library from the received natural language libraries, wherein the aggregated natural language library includes a plurality of natural language sub-libraries, wherein at least two of the natural language sub-libraries are associated with different client applications that each provide a service;
   receiving a search query via the network;
   comparing the search query to the aggregated natural language library to determine at least one natural language query that corresponds to the search query; and
   providing a response to the search query from the aggregated natural language library to a client device.

2. The method according to claim 1, further comprising storing the two or more natural language libraries and the aggregated natural language library in a database.

3. The method according to claim 1, wherein the plurality of natural language sub-libraries includes a plurality of aggregated natural language sub-libraries, each of the aggregated natural language sub-libraries comprising natural language libraries with substantially similar subject matter that are combined together.

4. The method according to claim 3, further comprising providing access to an aggregated natural language sub-library to a service provider having a client application that provides a service that is substantially similar to the service associated with the aggregated natural language sub-library.

5. The method according to claim 1, further comprising determining a natural language query for a requested service included in the search query, the search query comprising sound input.

6. The method according to claim 5, wherein when the natural language query does not correspond to at least one query included in the aggregated natural language library, the natural language query is provided to a plurality of service providers that each have an application that provides a service that is substantially similar to the requested service associated with the natural language query.

7. The method according to claim 6, further comprising receiving at least one response to the natural language query from the plurality of service providers.

8. The method according to claim 7, further comprising receiving feedback from the client device regarding accuracy of the response.

9. The method according to claim 1, wherein a natural language query comprises a request to interact with a client application that provides a service.

10. The method according to claim 1, wherein the aggregated natural language library comprises a rule-based model for processing natural language queries.

11. A natural language query processor, comprising:
    a memory for storing executable instructions;
    a processor for executing instructions stored in memory to:
       receive natural language libraries from service providers via a network, where each natural language library comprises:
          natural language queries for interacting with a client application; and
          responses for the natural language queries;
       generate an aggregated natural language library from the received natural language libraries, wherein the aggregated natural language library includes a plurality of natural language sub-libraries, wherein at least two of the natural language sub-libraries are associated with different client applications that each provide a service;
       receive a search query via the network from at least one client;
       compare the search query to the aggregated natural language library to determine at least one natural language query that corresponds to the search query; and
       provide a response to the search query from the aggregated natural language library to a client device.

12. The processor according to claim 11, wherein the processor further stores the natural language libraries and the aggregated natural language library in a database.

13. The processor according to claim 11, wherein the plurality of natural language sub-libraries includes a plurality of aggregated natural language sub-libraries, each of the aggregated natural language libraries comprising substantially similar natural language libraries that are combined together based upon a service associated with each of the substantially similar natural language libraries.

14. The processor according to claim 13, wherein the processor further provides access to an aggregated natural language sub-library to a service provider having a different client application that provides a service that is substantially similar to the service associated with the aggregated natural language sub-library.

15. The processor according to claim 11, wherein the processor further determines a natural language query included in the search query, the natural language query being associated with a requested service, the search query comprising sound input.

16. The processor according to claim 15, wherein when the natural language query does not correspond to at least one natural language query included in the aggregated natural language library, the natural language query is provided to a plurality of service providers that each have an application that provides a service that is substantially similar to the requested service associated with the natural language query.

17. The processor according to claim 16, wherein the processor further receives at least one response to the natural language query from the plurality of service providers.

18. The processor according to claim 17, wherein the processor further receives feedback from the service provider regarding accuracy of the response.

19. The processor according to claim 11, wherein a natural language query comprises a request to interact with a client application that provides a service.

20. A method for processing natural language queries, the method comprising:
    receiving two or more natural language libraries from service providers via a network, the two or more natural language libraries comprising a customized natural language library, the customized natural language library comprising customized responses for natural language queries, wherein both the customized responses and the natural language queries are tailored to any of a service provider and a client application;

generating an aggregated natural language library from the received natural language libraries, wherein the aggregated natural language library includes a plurality of natural language sub-libraries, wherein at least two of the natural language sub-libraries are associated with different client applications that each provide a service;

receiving a search query via the network;

comparing the search query to the aggregated natural language library to determine a customized response that corresponds to the search query; and providing the customized response that corresponds to the search query to a client device.

21. The method according to claim 20, wherein the customized responses comprise any of an action relative to the client application, meta-data corresponding to an object, or combinations thereof.

22. The method according to claim 20, further comprising selecting the customized natural language library based upon an accuracy of the customized response relative to other customized responses generated by other customized natural language libraries.

23. The method according to claim 20, wherein the aggregated natural language library includes two or more customized natural language libraries.

24. The method according to claim 23, further comprising periodically updating the aggregated natural language library by any of: adding one or more additional customized natural language libraries, updating at least one of the two or more customizable customized natural language libraries, or combinations thereof.

25. The method according to claim 20, the customized natural language library comprising a rule-based model for processing natural language queries, the rule-based model being trained on natural language queries for interacting with a client application.

* * * * *

UNITED STATES PATENT AND TRADEMARK OFFICE
CERTIFICATE OF CORRECTION

PATENT NO. : 8,694,537 B2
APPLICATION NO. : 13/480400
DATED : April 8, 2014
INVENTOR(S) : Mohajer Page 1 of 1

It is certified that error appears in the above-identified patent and that said Letters Patent is hereby corrected as shown below:

In the Specification

Column 24, line 56, delete the word "processor" and insert the word --processors--.

Signed and Sealed this
Twenty-ninth Day of July, 2014

Michelle K. Lee
*Deputy Director of the United States Patent and Trademark Office*